(12) United States Patent
Ehrlich et al.

(10) Patent No.: US 8,985,628 B2
(45) Date of Patent: Mar. 24, 2015

(54) ADJUSTING DEVICE

(75) Inventors: Dirk Ehrlich, Bodenheim (DE); Thomas Degenstein, Mainz (DE)

(73) Assignee: GM Global Technology Operations LLC, Detroit, MI (US)

( * ) Notice: Subject to any disclaimer, the term of this patent is extended or adjusted under 35 U.S.C. 154(b) by 267 days.

(21) Appl. No.: 13/585,951

(22) Filed: Aug. 15, 2012

(65) Prior Publication Data

US 2013/0042717 A1  Feb. 21, 2013

(30) Foreign Application Priority Data

Aug. 16, 2011 (DE) .......... 10 2011 110 701

(51) Int. Cl.
*B62D 1/18* (2006.01)
*B62D 1/184* (2006.01)

(52) U.S. Cl.
USPC .......................... 280/775; 74/493

(58) Field of Classification Search
USPC .................. 280/775, 777; 74/493
See application file for complete search history.

(56) References Cited

U.S. PATENT DOCUMENTS

| | | | |
|---|---|---|---|
| 4,709,592 A * | 12/1987 | Andersson ............... | 74/493 |
| 5,035,446 A | 7/1991 | Arvidsson | |
| 5,449,199 A * | 9/1995 | Heinrichs et al. ......... | 280/775 |
| 5,787,759 A | 8/1998 | Olgren | |
| 5,829,311 A | 11/1998 | Roberson | |
| 5,988,679 A | 11/1999 | Schelling et al. | |
| 6,237,438 B1 | 5/2001 | Ben Rhouma et al. | |
| 6,390,505 B1 | 5/2002 | Wilson | |
| 7,055,860 B2 | 6/2006 | Armstrong et al. | |
| 8,359,945 B2 * | 1/2013 | Tanke et al. ................... | 74/493 |

FOREIGN PATENT DOCUMENTS

| | | |
|---|---|---|
| DE | 19906445 A1 | 8/2000 |
| DE | 19954592 A1 | 5/2001 |
| DE | 10107775 A1 | 9/2001 |
| DE | 10037760 A1 | 2/2002 |
| DE | 10055114 A1 | 5/2002 |
| DE | 10235159 A1 | 2/2004 |
| DE | 10326119 B3 | 2/2005 |
| DE | 102005038809 A1 | 2/2007 |
| EP | 0594173 A1 | 4/1994 |
| EP | 1375296 A1 | 1/2004 |
| JP | 2004009898 A | 1/2004 |

OTHER PUBLICATIONS

German Patent Office, German Search Report for Application No. 102011110701.4, dated May 31, 2012.

* cited by examiner

*Primary Examiner* — Faye M. Fleming
(74) *Attorney, Agent, or Firm* — Ingrassia Fisher & Lorenz, P.C.

(57) ABSTRACT

An adjusting device for a steering column of a motor vehicle for axial and/or vertical positioning of a steering wheel connected to the steering column is provided. The adjusting device comprises a locking device and an electric switch configured to actuate the locking device.

15 Claims, 3 Drawing Sheets

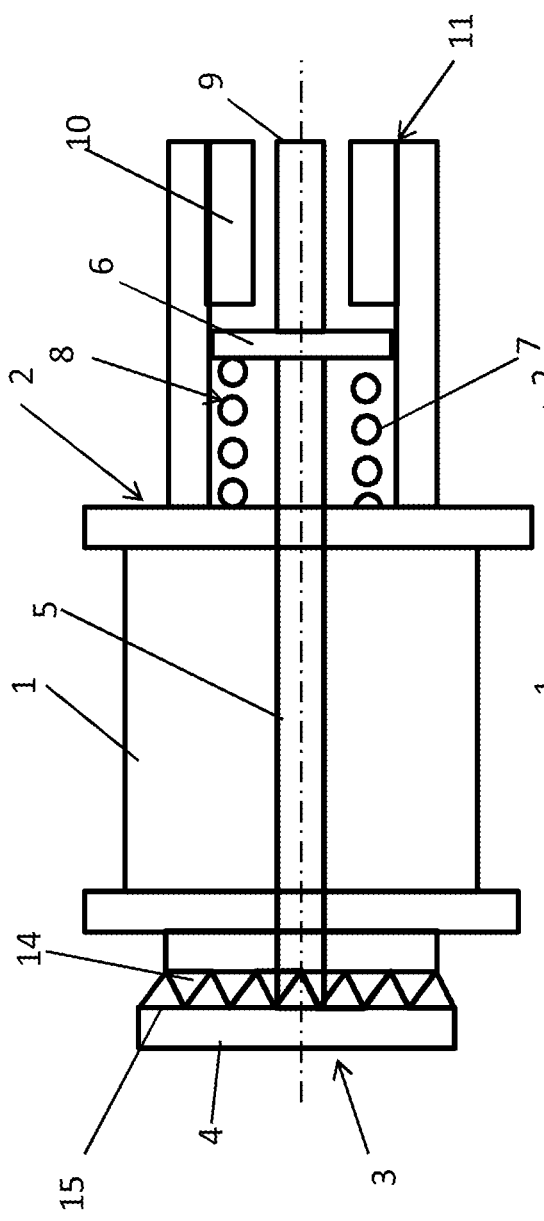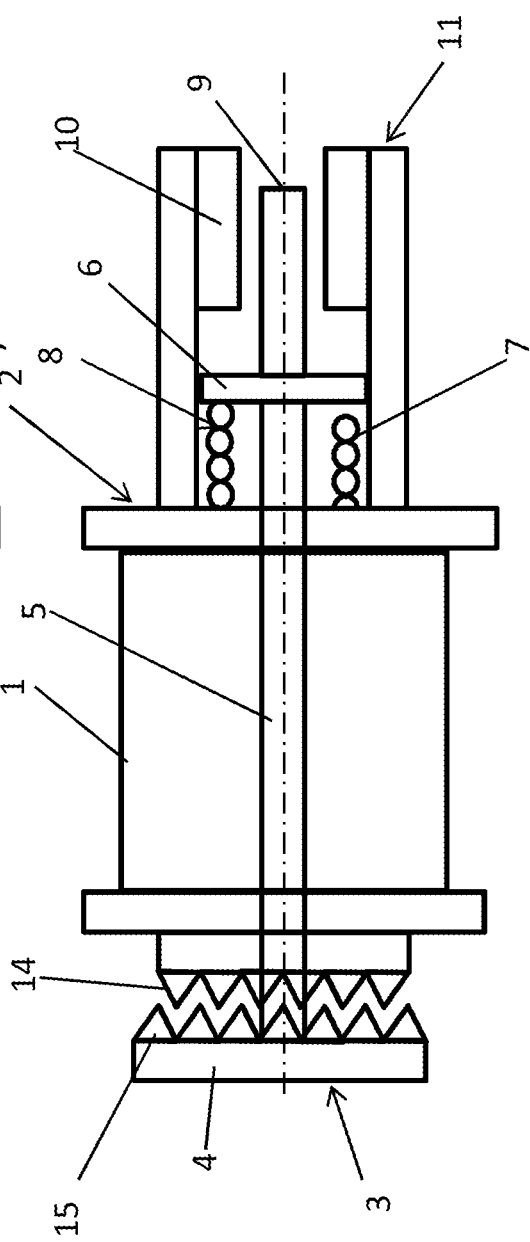

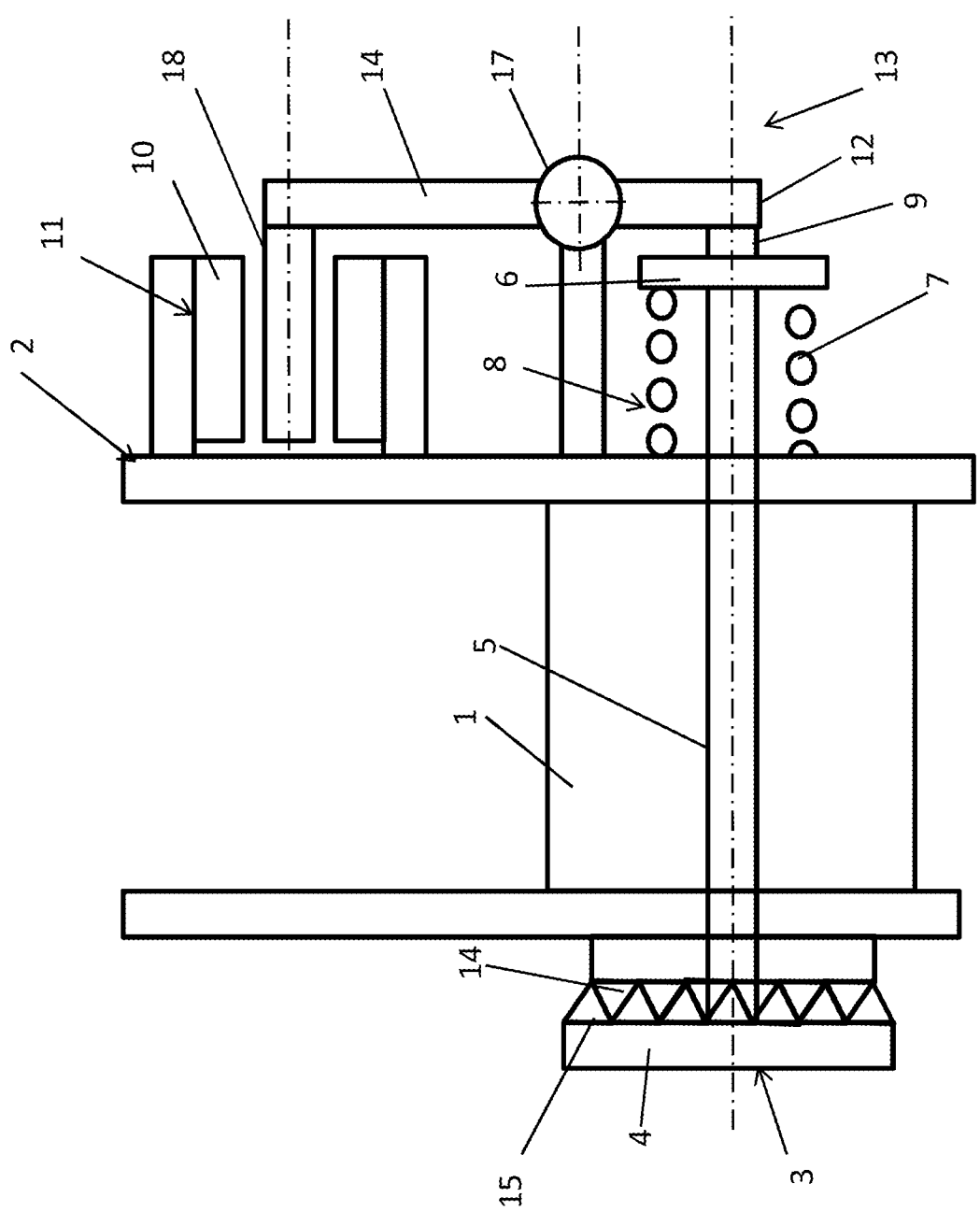

ADJUSTING DEVICE

CROSS-REFERENCE TO RELATED APPLICATION

This application claims priority to German Patent Application No. 10 2011 110 701.4, filed Aug. 16, 2011, which is incorporated herein by reference in its entirety.

TECHNICAL FIELD

The technical field relates to an adjusting device for a steering column of a motor vehicle.

BACKGROUND

EP 594 173 A1 discloses an adjusting device for adjusting a steering wheel fixed on a steering column that is rotatable in bearings fixed to the body. The adjusting device comprises an adjusting element that can be actuated by means of a trigger device.

Known from practice is an adjustable steering column for a motor vehicle. The adjustable steering column comprises a locking device that can be locked or unlocked mechanically by means of a lever that can be operated by a driver. As a result of the necessary proximity to the locking device, the lever is mounted in the immediate vicinity of the steering column, frequently in the area of the driver's knee, which on the one hand in the event of an accident is disadvantageous as a result of the risk of injury and on the other hand is not always advantageous from the ergonomic viewpoint.

Accordingly, it is desirable to provide a lever that is matched to the design of the motor vehicle while being easy to use, that does not have a visually disturbing appearance, and that is easy to find for the driver. In addition, other objects, desirable features and characteristics will become apparent from the subsequent summary and detailed description, and the appended claims, taken in conjunction with the accompanying drawings and this background.

SUMMARY

In an exemplary embodiment, an adjusting device is provided such that associated control elements do not have a perturbing effect in the interior of the motor vehicle.

In one embodiment, an adjusting device for a steering column of a motor vehicle for axial and/or vertical positioning of a steering wheel connected to a steering column is assigned a locking device that can be actuated by means of an electric switch.

The switch, that is a control element for acting upon the locking device, which releases or blocks the steering column for an axial and/or vertical adjustment of the steering wheel so that the steering wheel remains in the desired position, can be disposed arbitrarily in the interior of the motor vehicle and accordingly does not have either a visually or technically disturbing effect in the interior. In particular, the switch can be disposed in such a manner than there is no risk of injury in the event of an accident. The switch can be disposed in an immediate access range of a driver of the motor vehicle, for example, as a switch in the area of a steering wheel or as a steering wheel switch. The steering wheel adjustment in an embodiment is accomplished by simple manual adjustment, i.e. the driver actuates the switch for releasing the locking device, shifts the steering wheel through his physical force into the desired position and locks it there, by again actuating or releasing the switch in order to bring the locking device into operative engagement. A switch that is actuated so that the locking device releases the steering column for the adjustment and brings about locking of the steering column by the locking device when released constitutes an advantageous design from safety aspects.

According to a further embodiment, the steering column is manually adjustable, for example, in a telescopic manner and/or is displaceable in its inclination relative to a floor of the motor vehicle. The steering column can be fixed positively and/or non-positively in its position by a blocking element of the locking device, for example, by a toothed structure assigned to the steering column, which cooperates with a toothed element of the locking device, wherein the blocking element is displaceable by an electromagnet in the radial direction in order to come into operative engagement or out of operative engagement with the steering column. The connection between the switch and the electromagnet that displaces the blocking element or its coil is accomplished by electrical conductors that are easy to lay, which can be guided arbitrarily through the interior of the motor vehicle so that these two parts can be disposed at different positions, which are selected, for example, according to the space available or the accessibility. The blocking element, which in an exemplary embodiment is configured as a toothed element, cooperates positively with the steering column correspondingly having a toothed structure, and reliably locks the steering column even upon impingement of a large force, for example in the event of an accident. Naturally the toothed structure need not be directly assigned to the steering column but can be part of a holder of the steering column, whose locking effects a fixing of the steering column position. Configurations of corresponding holders are familiar to the person skilled in the art.

In one embodiment, the blocking element is held by a spring in the position fixing the steering column and the electromagnet can be acted upon by voltage by actuating the switch to release the fixing for adjustment of the steering column. In the currentless state of the electromagnet the blocking element is located in a blocking position through the spring, which is cancelled by an application of voltage, for example during the actuation of the switch designed as a pushbutton switch, for actuation of the steering wheel in the axial and/or vertical direction. Naturally, the switch can be designed either mechanically or from the switching technology viewpoint in such a manner that after its release, it supplies the coil with voltage and a renewed actuation of the switch is required to switch off or interrupt the voltage.

Expediently the blocking element is displaceably mounted in an adjusting carriage of a casing tube assigned to the steering column radially to the steering column.

In an embodiment, the blocking element is connected to a tappet mounted displaceably in the adjusting carriage, which has a head at its end opposite the blocking element, which on the side facing the blocking element serves as a stop for one end of the spring configured as compressive spring, the other end thereof being supported on the adjusting carriage of the casing tube. Consequently, it is ensured with a low space requirement that the blocking element reliably locks the steering column with a coil in the non-energized state and furthermore is mounted reliably displaceably.

In order that the tappet and therefore blocking element connected in particular in one piece with the tappet is displaced directly in the axial direction in the various switching states of the coil, on the side opposite the compressive spring the head is provided with a shoulder that either cooperates directly or via a pivotably mounted two-armed lever with the coil of the electromagnet. The arrangement of the two-armed lever is positive if, as a result of the installation situation, the coil needs to be arranged offset to the tappet or the forces required for movement of the blocking element by the coil or the magnetic field cannot be achieved. In one embodiment, the one arm of the two-armed lever actuates the free end of the shoulder and the other arm has a pin cooperating with the coil of the electromagnet, where a bearing of the lever is assigned to the adjusting carriage.

In order that an adjustment of the steering wheel does not take place when the motor vehicle is traveling, the blocking element of the locking device is displaceable depending on the speed of the motor vehicle. For example, the blocking element can only be released for adjustment when the motor vehicle is at a standstill whereas when the motor vehicle is traveling, even in the event of a corresponding actuation of the switch, the coil is not supplied with voltage in order to build up a magnetic field which brings about a release of the blocking element from the steering column.

In order to be easily reachable and visually perceptible for a driver, the switch is disposed on the steering wheel. This location of the arrangement is also appropriate since the driver grips with his hands around the steering wheel for manual adjustment of the steering wheel.

Expediently, the switch is assigned different functions depending on the speed of the motor vehicle. Advantageously the switch is coupled to a central controller of the motor vehicle and is preferably part of a speed regulating system. Whereas the function of the switch assigned to the adjusting device for releasing the blocking element is only required when the motor vehicle is at a standstill, the driver only uses the switch of the speed regulating system when the motor vehicle is traveling.

It is understood that the aforesaid features and those to be explained hereinafter can be used not only in the combination given in each case but also in other combinations.

BRIEF DESCRIPTION OF THE DRAWINGS

The various embodiments will hereinafter be described in conjunction with the following drawing figures, wherein like numerals denote like elements, and wherein:

FIG. 1 shows a schematic view of an adjusting device on an adjusting carriage of a motor vehicle in a locked position according to an exemplary embodiment;

FIG. 2 shows the adjusting device according to FIG. 1 in a released position;

FIG. 3 shows the adjusting device according to FIG. 1 in an alternative embodiment in a locked position.

DETAILED DESCRIPTION

Figure 4:
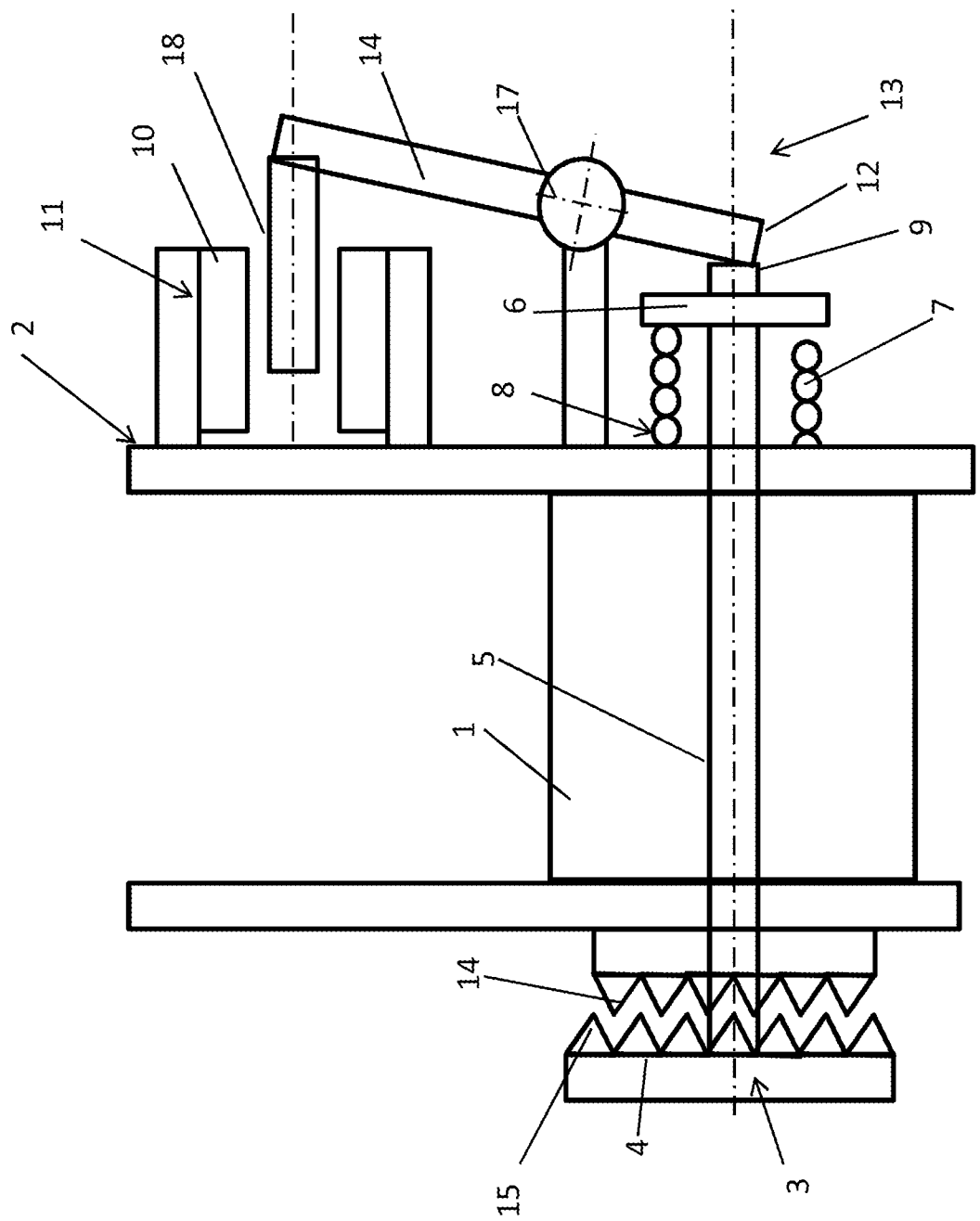
FIG. 4 shows the adjusting device according to FIG. 3 in a released position.

The following detailed description is merely exemplary in nature and is not intended to limit the various embodiments or the application and uses thereof. Furthermore, there is no intention to be bound by any theory presented in the preceding background or the following detailed description.

In order to increase the comfort of a driver, a steering column is telescopable in the axial direction and can be inclined in the vertical direction in order to bring a steering wheel connected to the steering column closer to the driver or move it further away from the driver and/or to change its inclination so that he finds a convenient position for his arms, and the view to a combination instrument is unrestricted. Referring to FIGS. 1 and 2, the adjusting device for the steering column is assigned to an adjusting carriage 1 of a casing tube with a holder 2 for the steering column and comprises a locking device 3 that can be actuated by an electrical switch, which is not shown. The steering column is manually adjustable, i.e. a driver pulls the steering wheel toward his body or pushes it away from his body in order to bring it into the desired position. In this case, the steering column is telescoped. An adjustment of the steering wheel and therefore of the steering column in the inclination relative to a floor of the motor vehicle is possible. Locking in the adjusted position is accomplished positively by a blocking element 4 of the locking device 3.

The blocking element 4 is connected to a tappet 5 mounted in the adjusting carriage 1 of the casing tube, which has a head 6 at its end opposite the blocking element 4, which serves as a stop for one end of a spring 8 configured as compressive spring 7, the other end being supported on the adjusting carriage 1. On the side opposite the compressive spring 7, the head 6 of the tappet 5 is provided with a shoulder 9, which cooperates with a coil 10 of the electromagnet 11.

In an alternative embodiment, as illustrated in FIG. 3, the shoulder 9 of the tappet 5 rests on one arm 12 of a two-armed lever 13 pivotably on the adjusting carriage 1, the other arm 14 has a pin 18, which engages in the coil 10 of the electromagnet 11 disposed parallel to the tappet 5. For adjustment of the steering column, the driver of the motor vehicle actuates the switch, for example, disposed on the steering wheel, for closing a circuit for applying voltage to the coil 10. As a result of the acting magnetic field, the tappet 5 is displaced against the direction of action of the compressive spring 7 and the blocking element 4, preferably provided with a toothed element 15, goes out of operative engagement with a toothed structure 16 assigned to the steering column, as illustrated in FIG. 4. The positive connection between the locking device 3 and the steering column is thus cancelled and the steering column can be adjusted. If the driver releases the actuating element of the switch and opens the circuit of the coil 10, as a result of the action of the compressive spring 7, the tappet 5 is displaced in such a manner that the toothed element 15 of the blocking element 4 enters into operative engagement with the toothed structure 16 assigned to the steering column in order to block the steering column in its adjustability.

If the two-armed lever 13 is disposed between the coil 10 of the electromagnet 11 and the tappet 5, the supply of the coil 10 with voltage brings about a pivoting of the lever 13 in its mounting 17 as a result of the actuation of the switch and an accompanying displacement of the tappet 5 for releasing the locking by the blocking element 4. If the coil 10 is not energized, a restoring movement by the compressive spring 7 then takes place. The forces required to displace the tappet 5 can be applied if the lengths of the arms 12, 14 of the lever are dimensioned accordingly.

In order to prevent a risk of accident as a result of an unintentional adjustment of the steering column or an adjustment of the steering column when the motor vehicle is traveling, the blocking element 4 of the locking device 3 can be displaced depending on the speed of the motor vehicle. For this purpose the switch is coupled to a central controller of the motor vehicle, at which speed signals are present.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. An adjusting device for a steering column of a motor vehicle for axial and/or vertical positioning of a steering wheel connected to the steering column, the adjusting device comprising:
   a locking device comprising
      a blocking element configured to fix the steering column in a position,
      a shoulder operatively connected to the blocking element, and
      an electromagnet configured to displace the shoulder in a radial direction such that the blocking element is also displaced in a radial direction to come into or out of operative engagement with the steering column; and
   an electric switch configured to actuate the locking device.

2. The adjusting device according to claim 1, wherein the steering column is manually adjustable and/or is displaceable at an inclination relative to a floor of the motor vehicle.

3. The adjusting device according to claim 2 wherein the steering column is manually adjustable in a telescopic manner.

4. The adjusting device according to claim 1, wherein the blocking element is a toothed structure that is coupled to the steering column and that cooperates with a toothed element of the locking device.

5. The adjusting device according to claim 1, wherein the blocking element is held by a spring in a position fixing the steering column and the electromagnet is acted upon by voltage by actuating a switch to release the position for adjustment of the steering column.

6. The adjusting device according to claim 1, wherein the blocking element is displaceably mounted in an adjusting carriage of a casing tube coupled to the steering column at right angles to a longitudinal axis of the steering column.

7. The adjusting device according to claim 6, wherein the blocking element is connected to a tappet mounted displaceably in the adjusting carriage, wherein the tappet has a head at an end opposite the blocking element, and wherein a side facing the blocking element serves as a stop for one end of a spring configured as a compressive spring, another end thereof being supported on the adjusting carriage of the casing tube.

8. The adjusting device according to claim 7, wherein the shoulder is disposed on a side opposite the compressive spring the head and wherein the shoulder either cooperates directly or via a pivotably mounted two-armed lever with a coil of the electromagnet.

9. The adjusting device according to claim 8, wherein one arm of the pivotably mounted two-armed lever actuates a free end of the shoulder and a second arm has a pin cooperating with the coil of the electromagnet, wherein a bearing of the pivotably mounted two-armed lever is coupled to the adjusting carriage.

10. The adjusting device according to claim 1, wherein the blocking element of the locking device is displaceable as a function of a speed of the motor vehicle.

11. The adjusting device according to claim 1, wherein the electric switch is disposed on the steering wheel.

12. The adjusting device according to claim 1, wherein different functions are assigned to the electric switch as a function of a speed of the motor vehicle.

13. The adjusting device according to claim 1, wherein the electric switch is coupled to a central controller of the motor vehicle and is part of a speed regulating system.

14. An adjusting device for a steering column of a motor vehicle for axial and/or vertical positioning of a steering wheel connected to the steering column, the adjusting device comprising:
   a locking device; and
   an electric switch configured to actuate the locking device;
      wherein different functions are assigned to the electric switch as a function of a speed of the motor vehicle.

15. An adjusting device for a steering column of a motor vehicle for axial and/or vertical positioning of a steering wheel connected to the steering column, the adjusting device comprising:
   a locking device; and
   an electric switch configured to actuate the locking device;
      wherein the electric switch is coupled to a central controller of the motor vehicle and is part of a speed regulating system.

* * * * *